US012800335B2

(12) United States Patent
Hourunranta

(10) Patent No.: US 12,800,335 B2
(45) Date of Patent: Nov. 17, 2026

(54) METHOD, APPARATUS, AND COMPUTER PROGRAM PRODUCT FOR FACILITATING SELECTION OF ELECTRIC VEHICLE CHARGE POINTS

(71) Applicant: HERE GLOBAL B.V., Eindhoven (NL)

(72) Inventor: Ari Hourunranta, Tampere (FI)

(73) Assignee: HERE GLOBAL B.V., Eindhoven (NL)

( * ) Notice: Subject to any disclaimer, the term of this patent is extended or adjusted under 35 U.S.C. 154(b) by 140 days.

(21) Appl. No.: 18/605,243

(22) Filed: Mar. 14, 2024

(65) Prior Publication Data

US 2025/0290769 A1 Sep. 18, 2025

(51) Int. Cl.

*G01C 21/00* (2006.01)
*B60L 53/63* (2019.01)
*G01C 21/36* (2006.01)

(52) U.S. Cl.

CPC .......... *G01C 21/3682* (2013.01); *B60L 53/63* (2019.02)

(58) Field of Classification Search

CPC ................. G01C 21/3682; B60L 53/63; B60L 2240/622; B60L 2260/44; B60L 2260/52;

(Continued)

(56) References Cited

U.S. PATENT DOCUMENTS

2009/0062967 A1* 3/2009 Kressner ................ G06Q 50/06 700/286
2015/0298565 A1* 10/2015 Iwamura ................ G06Q 10/04 701/22

(Continued)

FOREIGN PATENT DOCUMENTS

CN 110429620 B * 11/2021 ................ H02J 3/26
CN 116911473 A * 10/2023 ........... G06Q 10/047

(Continued)

OTHER PUBLICATIONS

Machine Translation of KR101105684 (Year: 2009).*

(Continued)

*Primary Examiner* — Anne Marie Antonucci
*Assistant Examiner* — Jordan T Smith
(74) *Attorney, Agent, or Firm* — Jeffrey R. Moisan; HERE GLOBAL B.V.

(57) ABSTRACT

An apparatus and method relate to analyzing metrics relating to EV charging points and facilitating selection of an EV charge point based on metrics associated with the EV charge points. Methods may include: determining locations of one or more electric vehicle charging stations; determining a total power available at the one or more electric vehicle charging stations; determining, for the one or more electric vehicle charging stations, if dynamic load balancing is used; determining occupancy of charge points at each of the one or more electric vehicle charging stations; calculating an available power at a charge point of the one or more electric vehicle charging stations based on the total power available and the occupancy of charge points for the one or more electric vehicle charging stations; and calculating an estimated time to charge a vehicle at the one or more electric vehicle charging stations based on the available power.

17 Claims, 4 Drawing Sheets

(58) Field of Classification Search
CPC ...... B60L 2260/54; B60L 3/12; B60L 53/305; B60L 53/66; B60L 58/12; B60L 2240/72; B60L 53/67; B60L 53/68; B60L 2240/80
See application file for complete search history.

(56) References Cited

U.S. PATENT DOCUMENTS

| | | | | |
|---|---|---|---|---|
| 2017/0138750 | A1 | 5/2017 | Weber | |
| 2017/0166074 | A1* | 6/2017 | Pflaum | G06Q 50/06 |
| 2020/0082352 | A1* | 3/2020 | Liu | G06N 20/00 |
| 2020/0401957 | A1 | 12/2020 | Wild et al. | |
| 2022/0050143 | A1 | 2/2022 | Maeda et al. | |
| 2023/0234468 | A1* | 7/2023 | Maeda | G06Q 50/40 320/109 |
| 2024/0190289 | A1* | 6/2024 | Bove, Jr. | H04N 21/41422 |
| 2024/0198848 | A1* | 6/2024 | Gordon | B60L 58/10 |
| 2024/0367547 | A1* | 11/2024 | Pettersson | B60L 58/12 |
| 2025/0033517 | A1* | 1/2025 | Hancock | B60L 53/66 |
| 2025/0128632 | A1* | 4/2025 | Calabro | B60L 53/64 |

FOREIGN PATENT DOCUMENTS

| | | | | |
|---|---|---|---|---|
| KR | 20100130452 | A * | 12/2010 | B60L 53/665 |
| KR | 101105684 | B1 * | 1/2012 | B60L 53/665 |
| KR | 20190126627 | A | 11/2019 | |

OTHER PUBLICATIONS

Machine Translation of CN110429620 (Year: 2021).*
Machine Translation of CN116911473 (Year: 2023).*
Machine Translation of KR20100130452 (Year: 2010).*
"EVBox Troniq High Power", Retrieved via the Wayback Machine on Nov. 20, 2024, <URL:https://web.archive.org/web/20230624100949/https://evbox.com/en/ev-chargers/troniq-high-power>, (Jun. 24, 2023), 20 pages.
"Use Google Maps features built into your electric vehicle", Retrieved via the Internet on Sep. 21, 2023, <URL:https://support.google.com/maps/answer/9773205?hl=en>, (Unknown Publication Date), 2 pages.
EVRoaming Foundation, "Realising cross-border charging", Retrieved via the Wayback Machine on Nov. 20, 2024, <URL:https://web.archive.org/web/20230702093038/https://evroaming.org/>, (Jul. 2, 2023), 3 pages.
Kempower, "The Benefits of Dynamic Charging of Electric Vehicles", Retrieved via the Internet on Nov. 20, 2024, <URL:https://kempower.com/the-benefits-of-dynamic-charging-of-electric-vehicles/>, (Oct. 21, 2021), 8 pages.
Virta, "What Is Dynamic Load Management in EV Charging?", Retrieved via the Internet on Nov. 20, 2024, <URL:https://www.virta.global/blog/what-is-dynamic-load-management>, (Apr. 9, 2018), 9 pages.

* cited by examiner

METHOD, APPARATUS, AND COMPUTER PROGRAM PRODUCT FOR FACILITATING SELECTION OF ELECTRIC VEHICLE CHARGE POINTS

TECHNOLOGICAL FIELD

An example embodiment of the present disclosure relates to facilitating selection of electric vehicle (EV) charging points, and more particularly, to analyzing metrics relating to EV charging points, and facilitating selection of an EV charge point based on metrics associated with the EV charge points.

BACKGROUND

Electric vehicle (EV) adoption is becoming widespread and is predicted to continue to grow strongly in coming years. EVs are generally efficient and produce few if any emissions while driving. However, the EV charging infrastructure available in most countries substantially lags the petroleum fuel infrastructure and is struggling to keep pace with the rate of adoption of EVs. The required public EV charging infrastructure requires substantial investment to keep up with the growing number of EVs.

Consumers rank not having enough access to efficient charging stations as a substantial barrier to EV purchase. With EV prices declining, model availability increasing, and driving range increasing, efficient and effective charging station availability may soon be the greatest barrier to increased EV adoption.

The charging infrastructure available in many areas includes too few charging points for which there is too much demand, broken chargers, high rates (cost), and confusion about how long is needed to charge a vehicle. The charging infrastructure poses one of the biggest challenges facing widespread adoption of EVs. While expansion of the EV charge point infrastructure will improve availability, other solutions to improve access to efficient and effective vehicle charging is needed.

BRIEF SUMMARY

A method, apparatus, and computer program product are provided in accordance with an example embodiment described herein for facilitating selection of electric vehicle (EV) charging points, and more particularly, to analyzing metrics relating to EV charging points, and facilitating selection of an EV charge point based on metrics associated with the EV charge points. Embodiments provide a method, apparatus, and computer program product to help a user identify a desirable EV charge point based on analysis of available EV charge points. According to an example embodiment, an apparatus is provided including at least one processor and at least one memory including computer program code, the at least one memory and computer program code configured to, with the processor, cause the apparatus to at least: determine locations of one or more electric vehicle charging stations; determine a total power available at the one or more electric vehicle charging stations; determine, for the one or more electric vehicle charging stations, if dynamic load balancing is used; determine occupancy of charge points at each of the one or more electric vehicle charging stations; calculate an available power at a charge point of the one or more electric vehicle charging stations based on the total power available and the occupancy of the charge points for the one or more electric vehicle charging stations; calculate an estimated time to charge a vehicle at the one or more electric vehicle charging stations based on the available power; and provide for presentation of an indication of the estimated time to charge the vehicle at the locations associated with the one or more electric vehicle charging stations on a map displayed on a user interface.

According to some embodiments, the indication of the estimated time to charge a vehicle at the locations associated with the one or more electric vehicle charging stations on the map displayed on a user interface comprises color-coded icons on the map at the locations of the one or more electric vehicle charging stations. According to some embodiments, causing the apparatus to calculate the estimated time to charge a vehicle at the one or more electric vehicle charging stations includes causing the apparatus to determine a target charge level for a vehicle; and calculate the estimated time to charge the vehicle at the one or more electric vehicle charging stations based on the target charge level and the available power.

According to some embodiments, causing the apparatus to determine, for the one or more electric vehicle charging stations, if dynamic load balancing is used includes causing the apparatus to: determine historical occupancy data for the one or more electric vehicle charging stations; analyze historical charge times during periods of relatively high occupancy and of relatively low occupancy; determine that dynamic load balancing is used in response to charge times being significantly lower during periods of relatively high occupancy than during periods of relatively low occupancy; and determine that load balancing is not used in response to charge times being relatively consistent during periods of relatively high occupancy and during periods of relatively low occupancy. According to some embodiments, causing the apparatus to determine occupancy of the charge points at each of the one or more electric vehicle charging stations includes causing the apparatus to: determine occupancy of the charge points at each of the one or more electric vehicle charging stations for an estimated time of arrival at the one or more electric vehicle charging stations and for a charging duration time period after arrival.

According to certain embodiments, causing the apparatus to calculate the available power at the charge point of the one or more electric vehicle charging stations based on the total power available and the occupancy of charge points for the one or more electric vehicle charging stations includes causing the apparatus to: calculate the available power at the charge point of the one or more electric vehicle charging stations based on the total power available and the occupancy of charge points for the one or more electric vehicle charging stations for the charging duration time period after arrival. The occupancy of the charge points at each of the one or more electric vehicle charging stations and for a charging duration time period after arrival are determined, in some embodiments, based on historical occupancy. According to some embodiments, causing the apparatus to determine, for the one or more electric vehicle charging stations, if dynamic load balancing is used includes causing the apparatus to process information associated with the one or more electric vehicle charging stations obtained from at least one of an Open Charge Point Interface, a charging station operator, a charging station owner, or a charging station service provider.

Embodiments provided herein include a computer program product including at least one non-transitory computer-readable storage medium having computer-executable program code portions stored therein, the computer-executable program code portions including program code instructions configured to: determine locations of one or more electric vehicle charging stations; determine a total power available at the one or more electric vehicle charging stations; determine, for the one or more electric vehicle charging stations, if dynamic load balancing is used; determine occupancy of charge points at each of the one or more electric vehicle charging stations; calculate an available power at a charge point of the one or more electric vehicle charging stations based on the total power available and the occupancy of charge points for the one or more electric vehicle charging stations; calculate an estimated time to charge a vehicle at the one or more electric vehicle charging stations based on the available power; and to provide for presentation of an indication of the estimated time to charge the vehicle at the locations associated with the one or more electric vehicle charging stations on a map displayed on a user interface.

According to some embodiments, the indication of the estimated time to charge a vehicle at the locations associated with the one or more electric vehicle charging stations on a map displayed on a user interface comprises color-coded icons on the map at the locations of the one or more electric vehicle charging stations. The program code instructions of some embodiments to calculate the estimated time to charge a vehicle at the one or more electric vehicle charging stations include program code instructions to: determine a target charge level for a vehicle; and calculate the estimated time to charge the vehicle at the one or more electric vehicle charging stations based on the target charge level and the available power.

The program code instructions to determine, for the one or more electric vehicle charging stations, if dynamic load balancing is used include, in some embodiments, program code instructions to: determine historical occupancy data for the one or more electric vehicle charging stations; analyze historical charge times during periods of relatively high occupancy and of relatively low occupancy; determine that dynamic load balancing is used in response to charge times being significantly lower during periods of relatively high occupancy than during periods of relatively low occupancy; and determine that load balancing is not used in response to charge times being relatively consistent during periods of relatively high occupancy and during periods of relatively low occupancy.

According to some embodiments, the program code instructions to determine occupancy of the charge points at each of the one or more electric vehicle charging stations include program code instructions to: determine occupancy of the charge points at each of the one or more electric vehicle charging stations for an estimated time of arrival at the one or more electric vehicle charging stations and for a charging duration time period after arrival. According to certain embodiments, the program code instructions to calculate the available power at the charge point of the one or more electric vehicle charging stations based on the total power available and the occupancy of charge points for the one or more electric vehicle charging stations include program code instructions to: calculate the available power at the charge point of the one or more electric vehicle charging stations based on the total power available and the occupancy of charge points for the one or more electric vehicle charging stations for the charging duration time period after arrival. The occupancy of the charge points at each of the one or more electric vehicle charging stations and for a charging duration time period after arrival are determined, in some embodiments, based on historical occupancy.

Embodiments provided herein include a method including: determining locations of one or more electric vehicle charging stations; determining a total power available at the one or more electric vehicle charging stations; determining, for the one or more electric vehicle charging stations, if dynamic load balancing is used; determining occupancy of charge points at each of the one or more electric vehicle charging stations; calculating an available power at a charge point of the one or more electric vehicle charging stations based on the total power available and the occupancy of charge points for the one or more electric vehicle charging stations; calculating an estimated time to charge a vehicle at the one or more electric vehicle charging stations based on the available power; and providing for presentation of an indication of the estimated time to charge a vehicle at the locations associated with the one or more electric vehicle charging stations on a map displayed on a user interface. According to some embodiments, the indication of the estimated time to charge the vehicle at the locations associated with the one or more electric vehicle charging stations on the map displayed on a user interface comprises color-coded icons on the map at the locations of the one or more electric vehicle charging stations.

According to some embodiments, calculating the estimated time to charge a vehicle at the one or more electric vehicle charging stations includes: determining a target charge level for a vehicle; and calculating the estimated time to charge the vehicle at the one or more electric vehicle charging stations based on the target charge level and the available power. According to certain embodiments, determining, for the one or more electric vehicle charging stations, if dynamic load balancing is used includes: determining historical occupancy data for the one or more electric vehicle charging stations; analyzing historical charge times during periods of relatively high occupancy and of relatively low occupancy; determining that dynamic load balancing is used in response to charge times being significantly lower during periods of relatively high occupancy than during periods of relatively low occupancy; and determining that load balancing is not used in response to charge times being relatively consistent during periods of relatively high occupancy and during periods of relatively low occupancy.

According to some embodiments, determining occupancy of the charge points at each of the one or more electric vehicle charging stations includes: determining occupancy of the charge points at each of the one or more electric vehicle charging stations for an estimated time of arrival at the one or more electric vehicle charging stations and for a charging duration time period after arrival. According to certain embodiments, calculating the available power at the charge point of the one or more electric vehicle charging stations based on the total power available and the occupancy of charge points for the one or more electric vehicle charging stations includes: calculating the available power at the charge point of the one or more electric vehicle charging stations based on the total power available and the occupancy of charge points for the one or more electric vehicle charging stations for the charging duration time period after arrival. The occupancy of the charge points at each of the one or more electric vehicle charging stations and for a charging duration time period after arrival are determined, in some embodiments, based on historical occupancy.

Embodiments provided herein include an apparatus including: means for determining locations of one or more electric vehicle charging stations; means for determining a total power available at the one or more electric vehicle charging stations; means for determining, for the one or more electric vehicle charging stations, if dynamic load balancing is used; means for determining occupancy of charge points at each of the one or more electric vehicle charging stations; means for calculating an available power at a charge point of the one or more electric vehicle charging stations based on the total power available and the occupancy of charge points for the one or more electric vehicle charging stations; means for calculating an estimated time to charge a vehicle at the one or more electric vehicle charging stations based on the available power; and means for providing for presentation of an indication of the estimated time to charge the vehicle at the locations associated with the one or more electric vehicle charging stations on a map displayed on a user interface. According to some embodiments, the indication of the estimated time to charge a vehicle at the locations associated with the one or more electric vehicle charging stations on the map displayed on a user interface comprises color-coded icons on the map at the locations of the one or more electric vehicle charging stations.

According to some embodiments, the means for calculating the estimated time to charge a vehicle at the one or more electric vehicle charging stations includes: means for determining a target charge level for a vehicle; and means for calculating the estimated time to charge the vehicle at the one or more electric vehicle charging stations based on the target charge level and the available power. According to certain embodiments, the means for determining, for the one or more electric vehicle charging stations, if dynamic load balancing is used includes: means for determining historical occupancy data for the one or more electric vehicle charging stations; means for analyzing historical charge times during periods of relatively high occupancy and of relatively low occupancy; means for determining that dynamic load balancing is used in response to charge times being significantly lower during periods of relatively high occupancy than during periods of relatively low occupancy; and means for determining that load balancing is not used in response to charge times being relatively consistent during periods of relatively high occupancy and during periods of relatively low occupancy.

According to some embodiments, the means for determining occupancy of the charge points at each of the one or more electric vehicle charging stations includes: means for determining occupancy of the charge points at each of the one or more electric vehicle charging stations for an estimated time of arrival at the one or more electric vehicle charging stations and for a charging duration time period after arrival. According to certain embodiments, the means for calculating the available power at the charge point of the one or more electric vehicle charging stations based on the total power available and the occupancy of charge points for the one or more electric vehicle charging stations includes: means for calculating the available power at the charge point of the one or more electric vehicle charging stations based on the total power available and the occupancy of charge points for the one or more electric vehicle charging stations for the charging duration time period after arrival. The occupancy of the charge points at each of the one or more electric vehicle charging stations and for a charging duration time period after arrival are determined, in some embodiments, based on historical occupancy.

BRIEF DESCRIPTION OF THE DRAWINGS

Figure 1:
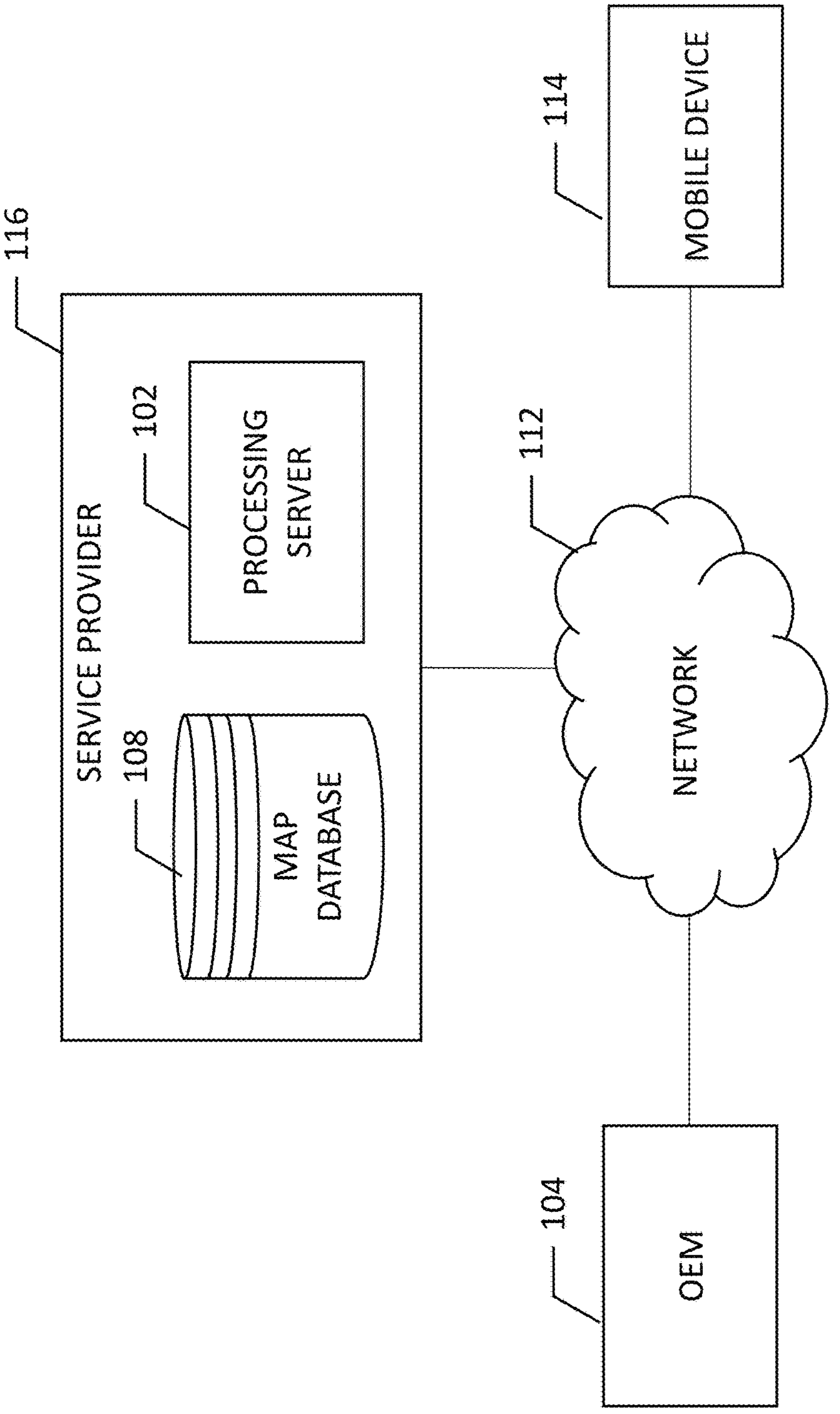
Figure 2:
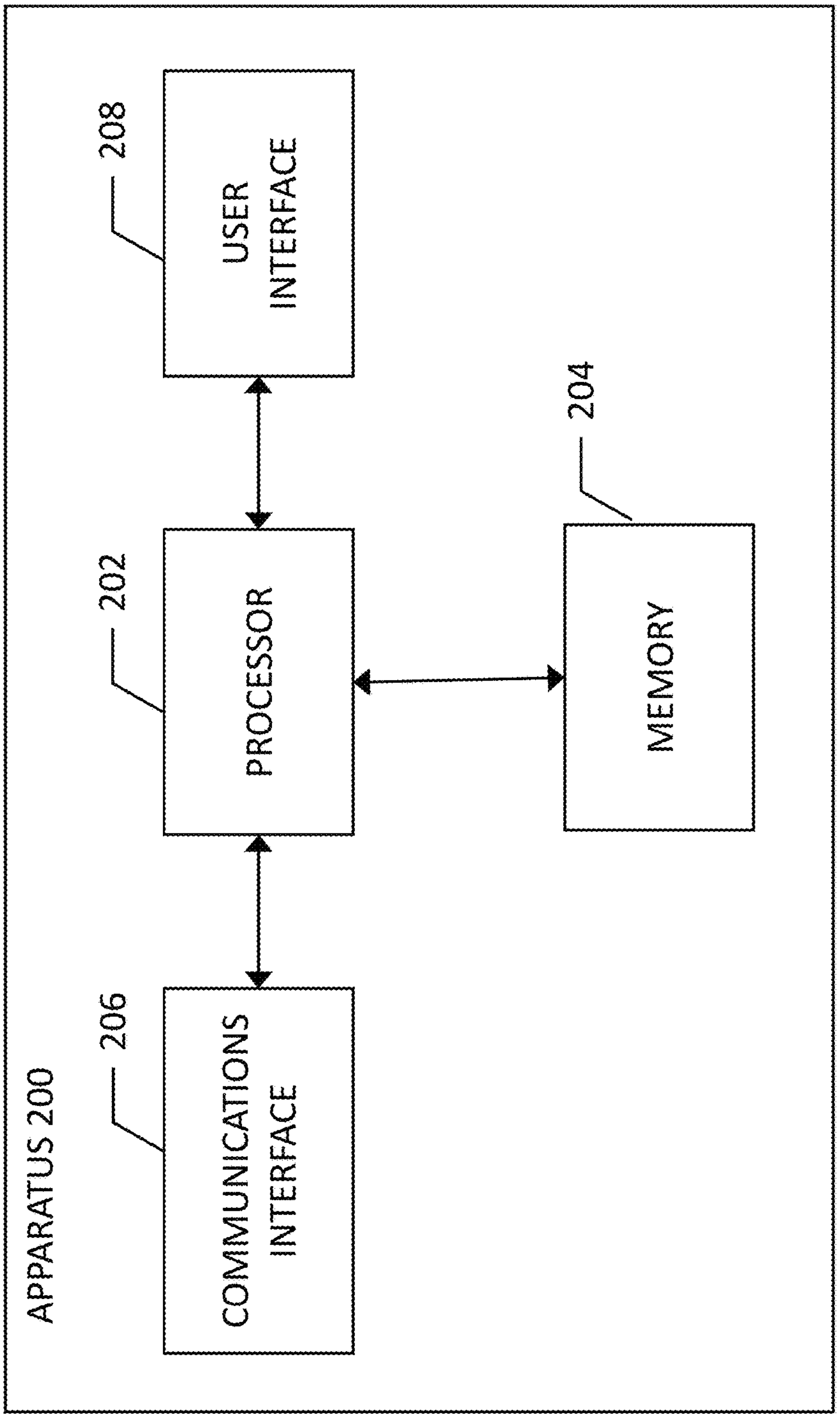
Figure 3:
Figure 4:
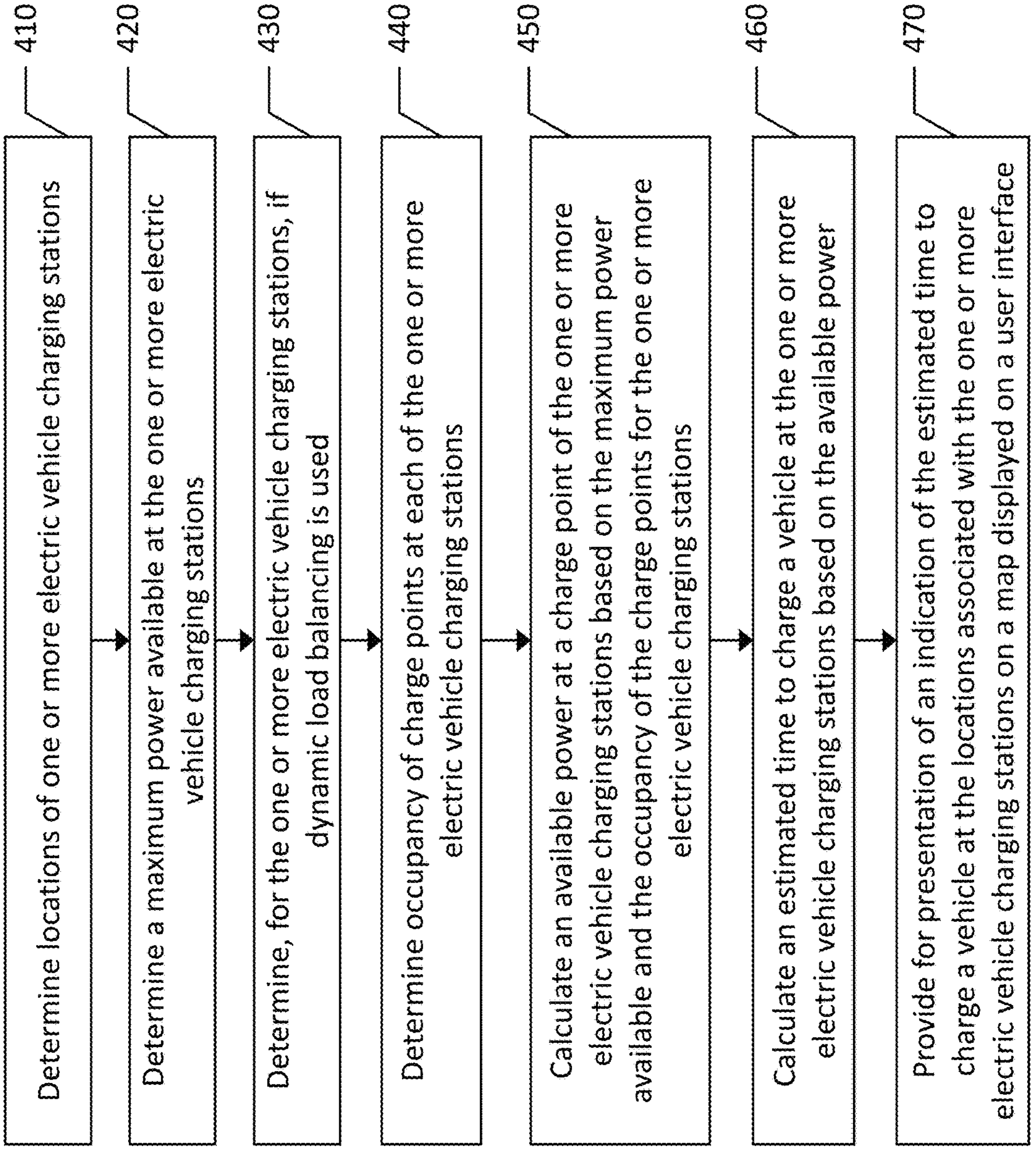

Having thus described example embodiments of the disclosure in general terms, reference will now be made to the accompanying drawings, which are not necessarily drawn to scale, and wherein:

FIG. 1 illustrates a communications diagram in accordance with an example embodiment of the present disclosure;

FIG. 2 is a block diagram of an apparatus that may be specifically configured for analyzing metrics relating to EV charging points, and facilitating selection of an EV charge point based on metrics associated with the EV charge points in accordance with an example embodiment of the present disclosure;

FIG. 3 illustrates a user interface display of a map including indicators of charging station efficiency according to an example embodiment of the present disclosure; and FIG. 4 is a flowchart of a method for analyzing metrics relating to EV charging points, and facilitating selection of an EV charge point based on metrics associated with the EV charge points according to an example embodiment of the present disclosure.

DETAILED DESCRIPTION

Some embodiments of the present disclosure will now be described more fully hereinafter with reference to the accompanying drawings, in which some, but not all, embodiments of the invention are shown. Indeed, various embodiments of the invention May be embodied in many different forms and should not be construed as limited to the embodiments set forth herein; rather, these embodiments are provided so that this disclosure will satisfy applicable legal requirements. Like reference numerals refer to like elements throughout. As used herein, the terms “data,” “content,” “information,” and similar terms may be used interchangeably to refer to data capable of being transmitted, received and/or stored in accordance with embodiments of the present invention. Thus, use of any such terms should not be taken to limit the spirit and scope of embodiments of the present disclosure.

In the infancy of vehicles powered by internal combustion engines the availability of fuel was challenging and limited the range of these vehicles to the distance they could travel based on the amount of fuel they could carry. Gradually, petroleum fueling stations were built to accommodate the burgeoning age of mass-produced vehicles. Eventually, petroleum fueling stations became ubiquitous allowing travelers to drive a vehicle to virtually any location reachable by roadways without concern for where they may obtain fuel along the way. Electric vehicles (EVs) in their relative infancy are experiencing the same issues experienced at the infancy of the internal combustion engine powered vehicle. Electric charging stations are not yet ubiquitous throughout all road networks, and demand outstrips availability in many regions particularly on high-demand days, such as around holidays. The EV charging infrastructure has not kept up with the rapid development and growth of EVs in many countries, hindering the adoption and growth of the EV market.

Widespread adoption of electric vehicles is almost inevitable with automotive manufacturers poised to convert their entire model lineups to EVs by ever-nearer deadlines in the future. The goals of these automotive manufacturers are laudable; however, these deadlines may be hindered by the EV charging infrastructure. With manufacturers ready to switch to and/or increase EV production, a lack of sufficient charging infrastructure can forestall those plans. With EVs producing fewer, if any, emissions while driving, notwithstanding charge-source power which can be renewable, delaying adoption of EVs over internal combustion engine-powered vehicles, despite their ever-improving efficiencies, can delay necessary overall emissions reductions. Thus, a robust and effective charging infrastructure is needed to ensure that charge point availability is not a hinderance in the widespread adoption of EVs.

While EV charge points can be selected based on geographic dispersion and proximity of other charge points, such a method does not address issues of availability and efficiency (i.e., time to charge). Embodiments provided herein provide a method of analyzing existing EV charge points and estimating charging times based on specific information pertaining to a given charge point. Providing EV drivers the ability to identify EV charge points based on how long it will take them to reach their desired level of charge can improve user satisfaction with their EVs, improve user satisfaction with regard to charging infrastructure, and maximize the efficiency of a charging infrastructure by recommending specific charge points based on total dynamic power availability and charge point availability.

By utilizing predicted occupancy of an EV charge point and ascertaining information about dynamic power, embodiments described herein can rank EV charge points by their available power per charger. The system of embodiments described herein give drivers of EVs a way to select an EV charge point that provides them with the fastest charging time. Embodiments further provide estimated charging times based on average charging sessions. For instance, charging of 40 kilowatt-hours take a certain amount of minutes at given locations. Further, using a vehicle's battery level and other relevant parameters, the charge time of a vehicle can more accurately be estimated using embodiments described herein.

To determine charge point efficiency and effectiveness for a given vehicle, a system as illustrated in FIG. 1 may be employed. FIG. 1 illustrates a communication diagram of an example embodiment of a system for implementing example embodiments described herein. The illustrated embodiment of FIG. 1 includes a service provider 116, a processing server 102 in data communication with a geographic map database, e.g., map database 108 through a network 112, one or more mobile devices 114, and an OEM 104 (Original Equipment Manufacturer). The mobile device 114 may be associated, coupled, or otherwise integrated with a vehicle, such as in a vehicle's head unit, infotainment unit, or an advanced driver assistance system (ADAS), for example. Additional, different, or fewer components may be provided. For example, many mobile devices 114 may connect with the network 112. The service provider 116 may include computer systems and network of a system operator. The processing server 102 may include the map database 108, such as a remote map server. The network may be wired, wireless, or any combination of wired and wireless communication networks, such as cellular, Wi-Fi, internet, local area networks, or the like.

The OEM 104 may include a server and a database configured to receive probe data from vehicles or devices corresponding to the OEM. For example, if the OEM is a brand of automobile, each of that manufacturer's automobiles (e.g., mobile device 114) may provide probe data to the OEM 104 for processing. That probe data may be encrypted with a proprietary encryption or encryption that is unique to the OEM. The OEM may be the manufacturer or service provider for a brand of vehicle or a device. For example, a mobile device carried by a user (e.g., driver or occupant) of a vehicle may be of a particular brand or service (e.g., mobile provider), where the OEM may correspond to the particular brand or service. The OEM may optionally include a service provider to which a subscriber subscribes, where the mobile device 114 may be such a subscriber. While depicted as an OEM 104 in FIG. 1, other entities may function in the same manner described herein with respect to the OEM. For example, independent location-based service providers or other entities may participate and contribute in the same manner as described herein with respect to an OEM. As such, the OEM 104 illustrated in FIG. 1 is not limited to original equipment manufacturers but may be any entity participating as described herein with respect to the OEMs.

The OEM 104 may provide aggregated mobility data from a plurality of probes or devices associated with a respective OEM. In this manner, the OEM 104 may be a data source that can provide substantial information to the service provider 116 for use in identifying where EV charge points are in use. Further, an OEM can anonymize data from the probes or devices associated with the OEM or subscribed to a service of the OEM. Anonymized mobility data may be anonymized in such a manner as to not reveal the source of the mobility data but may still provide valuable insight as to how and where EVs are being charged, and what charge points are being used. For example, an OEM may provide probe data points including location (e.g., latitude and longitude or a map-matched location) and a charge level or available battery range of a vehicle. Such information can provide insight into locations where vehicles are substantially depleted on battery charge and will be using or are using EV charge points.

The OEM 104 may further provide charge status information for individual vehicles. While this information may be readily available from an OEM, this data may come from other sources, such as an app running on a vehicle, a service used by the driver/owner of a vehicle, or other service provider that can obtain and share charge status information for a vehicle. Battery charge level (e.g., at the start and at the end of charging) can be used to determine what a vehicle may need and how long it may need to charge.

The amount of energy provided to vehicles may vary over time even with a single vehicle. Different amounts of energy may be delivered to a vehicle depending on the vehicle that is charging and how close to capacity the battery is. Charging speed or the amount of energy provided to a vehicle will decrease when a battery is nearing capacity (e.g., above 80% full capacity). Data from vehicle sensors or charge detail records can help predict the time required for a vehicle to charge at an EV charge point.

Information pertaining to EVs which may be received from an OEM or other service provider an include OEM vehicle specifics, such as battery capacity, charging type (e.g., connector, charge compatibility), etc. EV information can also include sensor data, which can include trajectory information (e.g. an origin and destination), a battery charge level at the beginning and end of a trajectory or drive, home charging events (e.g., including duration, energy delivered, time, battery levels), parking events, etc. This information may be anonymized, such as by an OEM, as the personally identifying information is not necessary in helping determine where demand will be for EV charge points. However, general location information may be useful to identify where charging events occur, where vehicle trips begin and end, etc.

The map database 108 may include node data, road segment data or link data, point of interest (POI) data, or the like. The map database 108 may also include cartographic data, routing data, and/or maneuvering data. According to some example embodiments, the road segment data records may be links or segments representing roads, streets, or paths, as may be used in calculating a route or recorded route information for determination of one or more personalized routes. The node data may be end points corresponding to the respective links or segments of road segment data. The road link data and the node data may represent a road network, such as used by vehicles, cars, trucks, buses, motorcycles, and/or other entities.

Optionally, the map database 108 may contain path segment and node data records or other data that may represent pedestrian paths or areas in addition to or instead of the vehicle road record data, for example. The road/link segments and nodes can be associated with attributes, such as geographic coordinates, street names, address ranges, speed limits, turn restrictions at intersections, and other navigation related attributes, as well as POIs, such as fueling stations, hotels, restaurants, museums, stadiums, offices, auto repair shops, buildings, stores, parks, etc. The map database 108 can include data about the POIs and their respective locations in the POI records. The map database 108 may include data about places, such as cities, towns, or other communities, and other geographic features such as bodies of water, mountain ranges, etc. Such place or feature data can be part of the POI data or can be associated with POIs or POI data records (such as a data point used for displaying or representing a position of a city). In addition, the map database 108 can include event data (e.g., traffic incidents, construction activities, scheduled events, unscheduled events, etc.) associated with the POI data records or other records of the map database 108.

The map database 108 may be maintained by a content provider e.g., a map developer. By way of example, the map developer can collect geographic data to generate and enhance the map database 108. There can be different ways used by the map developer to collect data. These ways can include obtaining data from other sources, such as municipalities or respective geographic authorities. In addition, the map developer can employ field personnel to travel by vehicle along roads throughout the geographic region to observe features and/or record information about them, for example. Also, remote sensing, such as aerial or satellite photography, can be used to generate map geometries directly or through machine learning as described herein.

The map database 108 may be a master map database stored in a format that facilitates updating, maintenance, and development. For example, the master map database or data in the master map database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data may be compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by mobile device 114, for example. The navigation-related functions can correspond to vehicle navigation, pedestrian navigation, or other types of navigation. The compilation to produce the end user databases can be performed by a party or entity separate from the map developer. For example, a customer of the map developer, such as a navigation device developer or other end user device developer, can perform compilation on a received map database in a delivery format to produce one or more compiled navigation databases.

As mentioned above, the server-side map database 108 may be a master geographic database, but in alternate embodiments, a client side map database 108 may represent a compiled navigation database that may be used in or with end user devices (e.g., mobile device 114) to provide navigation and/or map-related functions. For example, the map database 108 may be used with the mobile device 114 to provide an end user with navigation features. In such a case, the map database 108 can be downloaded or stored on the end user device (mobile device 114) which can access the map database 108 through a wireless or wired connection, such as via a processing server 102 and/or the network 112, for example.

In one embodiment, the mobile device 114 can be an in-vehicle navigation system, such as an ADAS, a personal navigation device (PND), a portable navigation device, a cellular telephone, a smart phone, a personal digital assistant (PDA), a watch, a camera, a computer, and/or other device that can perform navigation-related functions, such as digital routing and map display. An end user can use the mobile device 114 for navigation and map functions such as guidance and map display, for example, and for determination of one or more personalized routes or route segments based on one or more calculated and recorded routes, according to some example embodiments.

An ADAS may be used to improve the comfort, efficiency, safety, and overall satisfaction of driving. Examples of such advanced driver assistance systems include semi-autonomous driver assistance features such as adaptive headlight aiming, adaptive cruise control, lane departure warning and control, curve warning, speed limit notification, hazard warning, predictive cruise control, adaptive shift control, among others. Other examples of an ADAS may include provisions for fully autonomous control of a vehicle to drive the vehicle along a road network without requiring input from a driver. Some of these advanced driver assistance systems use a variety of sensor mechanisms in the vehicle to determine the current state of the vehicle and the current state of the roadway ahead of the vehicle. These sensor mechanisms may include radar, infrared, ultrasonic, and vision-oriented sensors such as image sensors and light distancing and ranging (LiDAR) sensors. Further, an ADAS can report charge status of an electric vehicle and charging events and locations.

Some advanced driver assistance systems may employ digital map data. Such systems may be referred to as map enhanced ADAS. The digital map data can be used in advanced driver assistance systems to provide information about the road network, road geometry, road conditions, and other information associated with the road and environment around the vehicle. Unlike some sensors, the digital map data is not affected by the environmental conditions such as fog, rain, or snow. Additionally, the digital map data can provide useful information that cannot reliably be provided by sensors, such as curvature, grade, bank, speed limits that are not indicated by signage, lane restrictions, and so on. Further, digital map data can provide a predictive capability well beyond the driver's vision to determine the road ahead of the vehicle, around corners, over hills, or beyond obstructions. Accordingly, the digital map data can be a useful and sometimes necessary addition for some advanced driving assistance systems. In the example embodiment of a fully autonomous vehicle, the ADAS uses the digital map data to determine a path along the road network to drive, such that accurate representations of the road are necessary, such as accurate representations of intersections and turn maneuvers there through.

The processing server 102 may receive probe data, directly or indirectly, from a mobile device 114, such as when the service provider is functioning as the OEM 104. Optionally, the service provider 116 may receive probe data indirectly from the mobile device 114, such as when the mobile device 114 provides probe data to the OEM 104, and the OEM provides certain elements of the probe data to the service provider 116. The OEM 104 may anonymize the probe data or otherwise process the probe data to maintain privacy of a user of the mobile device 114 before providing the data to the service provider 116. The mobile device 114 may include one or more detectors or sensors as a positioning system built or embedded into or within the interior of the mobile device 114. Alternatively, the mobile device 114 uses communications signals for position determination. The mobile device 114 may receive location data from a positioning system, such as a Global Navigation Satellite System (GNSS) like the global positioning system (GPS) Galileo, etc., cellular tower location methods, access point communication fingerprinting, or the like. The server 102, either directly or indirectly, may receive sensor data configured to describe a position of a mobile device, or a controller of the mobile device 114 may receive the sensor data from the positioning system of the mobile device 114. The mobile device 114 may also include a system for tracking mobile device movement, such as rotation, velocity, or acceleration. Movement information may also be determined using the positioning system. The mobile device 114 may use the detectors and sensors to provide data indicating a location of a vehicle. This vehicle data, also referred to herein as "probe data", may be collected by any device capable of determining the necessary information, and providing the necessary information to a remote entity. The mobile device 114 is one example of a device that can function as a probe to collect probe data of a vehicle.

More specifically, probe data (e.g., collected by mobile device 114) may be representative of the location of a vehicle at a respective point in time and may be collected while a vehicle is traveling along a route, at the origin of the route, a destination, or waypoints along the route. Probe data of some example embodiments may include charge status of a vehicle and charge capabilities/capacities of a vehicle. According to the example embodiment described below with the probe data being from motorized vehicles traveling along roadways, the probe data may include, without limitation, location data, (e.g. a latitudinal, longitudinal position, and/or height, GNSS coordinates, proximity readings associated with a radio frequency identification (RFID) tag, or the like), rate of travel, (e.g. speed), direction of travel, (e.g. heading, cardinal direction, or the like), device identifier, (e.g. vehicle identifier, user identifier, or the like), a time stamp associated with the data collection, or the like. The mobile device 114, may be any device capable of collecting the aforementioned probe data. Some examples of the mobile device 114 may include specialized vehicle mapping equipment, navigational systems, mobile devices, such as phones or personal data assistants, the vehicle itself, or the like. Further, this probe data may include battery charge level or other contextual information about a source of the probe data that may provide inputs to the service provider 116 for establishing where the vehicle may reach an EV charge point.

An example embodiment of a processing server 102 and/or an OEM 104 may be embodied in an apparatus as illustrated in FIG. 2. The apparatus, such as that shown in FIG. 2, may be specifically configured in accordance with an example embodiment of the present disclosure for identifying EV charge points and predicting how long a charge session would take at the EV charge points. The apparatus may include or otherwise be in communication with a processor 202, a memory device 204, a communication interface 206, and a user interface 208. In some embodiments, the processor (and/or co-processors or any other processing circuitry assisting or otherwise associated with the processor) may be in communication with the memory device via a bus for passing information among components of the apparatus. The memory device may be non-transitory and may include, for example, one or more volatile and/or non-volatile memories. In other words, for example, the memory device may be an electronic storage device (for example, a computer readable storage medium) comprising gates configured to store data (for example, bits) that may be retrievable by a machine (for example, a computing device like the processor 202). The memory device may be configured to store information, data, content, applications, instructions, or the like, for enabling the apparatus to carry out various functions in accordance with an example embodiment of the present invention. For example, the memory device could be configured to buffer input data for processing by the processor. Additionally or alternatively, the memory device could be configured to store instructions for execution by the processor.

The processor 202 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 202 may be configured to execute instructions stored in the memory device 204 or otherwise accessible to the processor. Alternatively or additionally, the processor may be configured to execute hard coded functionality. As such, whether configured by hardware or software methods, or by a combination thereof, the processor may represent an entity (for example, physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor specific device (for example, a mobile terminal or a fixed computing device) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

The apparatus 200 of an example embodiment may also include a communication interface 206 that may be any means such as a device or circuitry embodied in either hardware or a combination of hardware and software that is configured to receive and/or transmit data to/from a communications device in communication with the apparatus, such as to facilitate communications with one or more user equipment 104 or the like. In this regard, the communication interface may include, for example, an antenna (or multiple antennae) and supporting hardware and/or software for enabling communications with a wireless communication network. Additionally or alternatively, the communication interface may include the circuitry for interacting with the antenna(s) to cause transmission of signals via the antenna (s) or to handle receipt of signals received via the antenna(s). In some environments, the communication interface may alternatively or also support wired communication. As such, for example, the communication interface may include a communication modem and/or other hardware and/or software for supporting communication via cable, digital subscriber line (DSL), universal serial bus (USB) or other mechanisms.

The apparatus 200 may also include a user interface 208 that may in turn be in communication with the processor 202 to provide output to the user and, in some embodiments, to receive an indication of a user input. As such, the user interface may include a display and, in some embodiments, may also include a keyboard, a mouse, a joystick, a touch screen, touch areas, soft keys, one or more microphones, a plurality of speakers, or other input/output mechanisms. In one embodiment, the processor may comprise user interface circuitry configured to control at least some functions of one or more user interface elements such as a display and, in some embodiments, a plurality of speakers, a ringer, one or more microphones and/or the like. The processor and/or user interface circuitry comprising the processor may be configured to control one or more functions of one or more user interface elements through computer program instructions (for example, software and/or firmware) stored on a memory accessible to the processor (for example, memory device 204, and/or the like).

As discussed above, EV charging infrastructure requires substantial improvement and expansion to meet the demands of a rapidly increasing number of EVs on the road. Embodiments described herein provide a method through which EV charge points can be more effectively utilized. Embodiments described herein analyze metrics associated with EV charge points to facilitate selection of an EV charge point, such as based on the fastest charging time for a given EV.

Charging an EV presently takes more time than filling the fuel tank of a gasoline or diesel-powered vehicle at a fuel station, even when considering direct current (DC) fast chargers. With DC fast chargers, charging a battery of 80 k Wh from near-empty to near-full can take an hour. Limiting factors include available charging power at a charging station and the charging/battery capability of the vehicle being charged.

EV charging technology is evolving, and many EV charging equipment manufacturers support so called dynamic load balancing. Dynamic load management is a load balancing method of distributing power to a plurality of EVs being charged. Many EV charge points include a number of individual chargers for vehicles, where an individual charger is a charger dedicated to charging one vehicle. The concept of dynamic load balancing enables sharing the available power at a charge point with multiple vehicle chargers at the same location. The more vehicles present and charging at the charge point, the less power each of them receives. If only a small subset of the vehicle chargers at the charge point are charging, the available power per vehicle increases. A driver behind dynamic load balancing are limitations for the power set by the electrical grid and that electrical grid upgrades are generally very expensive.

Dynamic power availability can also be based on the power source. For example, a charging station that is powered by solar or wind may have variability in the available power level due to available sunlight or available wind. A charging station powered by such sources may include an energy storage device in the form of a battery or supercapacitor; however, if the power level of the power source is reduced for a prolonged period, or if demand exceeds capacity of the energy storage device, the power available at the charging station may be less than a maximum power generated by the power source.

In some higher capacity (vehicle volume) chare points, there may be further hierarchy for the load balancing such that balancing is applied separately on different subsets of chargers. For example, a charge point or subset of a charge point with six chargers may have a maximum total power of 300 kW. If that power is shared between six chargers, each charger gets 50 kW. However, if there is only one vehicle charger active, that charger receives all of the power it can handle. In practice, this may still be limited to, for example, 150 kW as vehicles may not be able to charge at higher powers. Further, EVs have certain characteristics of how much power can be used to charge the battery (a "charging curve") and this depends on the temperature, initial battery level, etc. So a maximum available charge power at a charge point may not be used by certain vehicles. The problem with dynamic load balancing becomes that occupied charge points are slower than unoccupied charge points; however, it is difficult to know this when selecting a charger.

The total power available at a charging station as described herein includes a total power available at the charging station for all charge points or the maximum power that can be produced by the charging points at the charging station. This may be lower than an absolute maximum power of the charging station. Further, as described above, the maximum total power available may be dynamic based on a power source or grid, such that the total power available at a charging station is not a fixed value, but may be dependent upon the source from which the charging station draws power. Total power available is the total power that the charging station is able to provide to all charge points of the charging station, or possibly to all charge points of a subset of the charge points at a charging station if the charging station has separate load balancing among subsets of charging points.

Charging station operators share charging location data with mobility service providers to inform applications and users of charge point occupancy. The shared data typically includes dynamic status information indicating which charge points are available and which charge points are occupied. The occupancy as described herein can include the current physical occupancy of a charging station at a given time, such that a charging station with five charge points that has three charge points actively charging a vehicle has an occupancy of 60%. The data is exchanged using Open Charge Point Interface (OCPI). An EV charging station or charging location includes a set of charge points or EV supply equipment (EVSE), each one having one or more physical connectors (e.g., different types of connectors) but is only able to charge one vehicle at a time. Power availability at these charging stations is typically presumed to be a fixed value. However, there are variations in the power at each charging point, particularly in a charging station that has dynamic power.

Embodiments described herein use the predicted occupancy of a charging station and information about total dynamic power to rank charging stations by their available power per charger. This provides drivers/users of electric vehicles an informed method of selecting which charging station they will use to charge their vehicle. Further, embodiments can provide a more accurate estimated charging time based on the information pertaining to occupancy and available dynamic power. Vehicle-specific information, such as battery level among other parameters can be used to still more accurately predict the charging time required for a specific vehicle. Using both total dynamic power for a charging station and the occupancy (actual and/or predicted), embodiments can rank charging stations according to a predicted charging speed. This enables a user to understand which charging station and charge points can be used for maximum efficiency.

In the case of a charging station with dynamic power and 300 kW of total power shared between six chargers, there is a substantial difference between a vehicle receiving 50 kW or 150 KW as the charging time can increase three-fold. If there is a number (N) of charging stations near a planned route, understanding their dynamic power capability and their predicted occupancy at a time of arrival enables embodiments to provide information to a user of charging efficiency and timeliness. Embodiments can optionally rank the charging stations by their predicted available power which can be translated to predicted charging time for an average charging session. Embodiments can further categorize charging stations by their predicted charging time (e.g., fast, medium, slow). Embodiments can further provide visualization of the expected charging times for the average charging session at each charging station. For example, charging stations where charging of 40 kWh can be achieved in under 20 minutes may be visualized in green, a charging time of 20-40 minutes may be visualized in orange or yellow, while a charging time above 40 minutes may be visualized in red.

Combining the knowledge of charging efficiency with the battery level of a vehicle and charging characteristics of a vehicle enable embodiments to estimate the time required to charge a vehicle. Further, embodiments can enable a user to select a charge level that they wish to achieve, and the estimated time to reach that selected charge level can be provided. This can be useful when a user knows of available charging at a destination but requires additional charge to reach the destination. The user may not need to fully charge their vehicle to 100% but may wish to charge the vehicle to 80% which is typically much faster than the time to reach 100%.

Embodiments can provide information relating to estimated charge time at specific charging stations according to a number of methods. If a user is traveling within a road network without a set destination in a navigational system of the vehicle or mobile device, embodiments can populate a map view of the vicinity of the vehicle with charging station locations and an indicator of their charging efficiency. If a user has not entered a destination into a navigational system or mobile device, but the user is traveling along a route that they regularly take as understood by mobility data of the navigational system or mobile device, embodiments may identify charging stations along the regularly used route along with their respective charging efficiencies. Optionally, if a user has entered a destination for their journey, embodiments can identify charging stations along the route along with their efficiency. Embodiments described herein may be aware of vehicle charge level and only provide recommendations regarding charging stations when a charge level or remaining vehicle range fall below a predetermined threshold. Optionally, when a destination of the vehicle is known or estimated (e.g., from familiar routes), charging stations may be identified and recommended based on efficiency using an estimate of the remaining charge for when the vehicle would reach the charging station.

According to an example embodiment, charging stations are searched within a predefined area that may be defined as outlined above along a user's route or within proximity of the user. For each charging station found, the number of charge points, otherwise referred to as EVSEs, at the charging station is identified. Embodiments determine if a given charging station uses dynamic load balancing and if so, what is the maximum total power. Using prediction data for the charging station, the predicted occupancy can be determined at the expected time of arrival at the charge station with a time period after arrival as occupancy while charging is also needed. The time period may vary and may be based on the total power at the charging station, the charge level needed by the vehicle, or an average time that vehicles spend at a particular charging station, for example. The predicted occupancy can include an indication of occupancy based on reserved charge points if a charging station operates on a reservation system. Such reservations can be presumed to reflect an occupied charge point within a certain degree of confidence, particularly if the reservation system includes penalties for a reservation that is not used (e.g., a no-show for a reservation and the reservation was not canceled). The result can be a percentage, such as 80% occupancy reflecting four out of five charging points are expected to be occupied. Actual occupancy data for a charging station can be obtained and used to help predict the occupancy at a time of arrival. Further, this data and historical data can be used to determine occupancy levels during the period after arrival when charging is occurring. From the above information, an expected power available for a vehicle at the charging station can be determined for the time of arrival and the duration thereafter. From the power available at each available charge point, an expected charging time can be derived to reach the desired charging level.

The expected charging time for a charge point at a charge station employing dynamic load balancing can thus be derived according to the following:

$$P_a = P_{tot}/(O*C_{EVSE})$$

$$t = E_{target}/P_a$$

where:

$C_{EVSE}$—the number of charging points at a charging station $P_{tot}$—the maximum total power of the charging station $P_a$—the available power for each charging point at the charging station O—the occupancy rate for the charging station $E_{target}$—the user-desired charge level or charge level needed for a vehicle in kWh t—the time to reach $E_{target}$ If there is no dynamic load balancing, the power indicated for each charging point can be used as the available power for the charge point. Since batteries cannot be charged at full power at all times, some safety margin in the estimated time to reach the target charge level can be used. The results of the above-described calculations can be graphically depicted on a map, such as using colors where a color such as green can indicate the highest charging power level available or fastest charging time, for example.

The above formula is one available process to estimate charge time using a uniform version of load balancing. However, in some implementations, the load balancing among charging stations may not be uniform. For example, a charging station may provide a level of charge to a vehicle based on the battery level of the vehicle. A vehicle having a low charge percentage may receive a greater proportion of the available power at the charge station than a vehicle having a higher charge percentage. Some vehicles may be limited, such as by their available connectors, by the vehicle architecture, or by dynamic vehicle properties (e.g., battery temperature) as to how much power they can receive. In such cases, a vehicle may not receive an equal portion of available dynamic power as other vehicles charging at a charge station. Further, charging stations may have premium customers, where certain vehicles (e.g., by brand or partnership) receive a higher level of power than other vehicles. Premium customers may optionally include customers who subscribe to a service, pay more for a service, or are members of a specific service that enables them to receive a higher level of charging power than those who are not premium customers. Thus, the dynamic load may not be equally balanced among charge points of a charging station, and the available power at a charge point may thus be dependent upon a number of factors.

Occupancy, as described above, includes a proportion of charge points that are occupied. However, occupancy can be substantially more nuanced. For example, as noted above, certain vehicles may draw more charge power than others. Occupancy can account for higher-draw vehicles. This can be accomplished in a number of ways. Occupancy can infer an average power draw on a per-vehicle basis from among a population. Occupancy can optionally distinguish between the average power draw per vehicle at different charging stations. For example, charging stations located in remote areas may be visited by more vehicles with low battery charge remaining, and those vehicles may draw more power than vehicles having a higher battery charge remaining. Thus, the average power draw per vehicle or power supplied to the average charge point at such a charging station may be higher than a charging station proximate an office building, where vehicles may be more likely to be "topped off" on a relatively high percentage of battery charge from a commute.

Occupancy can further be learned based on historical information and/or from predicted charge point utilization. For example, charging stations may have higher power demand during periods of heavy travel, such as during holidays or times when people typically vacation. This higher demand and higher level of power consumption, along with longer charging times, may influence the occupancy for a charging station. Such fluctuations may be predicted and anticipated by embodiments described herein when identifying occupancy of a charging station. Certain regions of the country may include higher concentrations of a certain brand of electric vehicle, and those vehicles may receive higher levels of charge power when occupancy at a charging station is high relative to electric vehicles of other brands. As such, occupancy can factor this in when identifying the occupancy level of a charging station in such an area, and whether a vehicle for which charge time is being estimated is of the certain brand or not.

Historical occupancy can be determined for example, using time series analysis of previously obtained data. This can be used for time series forecasting using a model to predict future occupancy based on the historical data. Occupancy and predicted occupancy can be enhanced with information to improve predictions relying only on historical occupancy data. For example, as a region grows over time, historical occupancy may be quickly outdated, and occupancy forecasting can consider growth, amenity construction, or other influences on the occupancy of a charging station.

FIG. 3 illustrates an example embodiment of a map 300 of a geographic region. The map may include at least a portion of a user's route if a destination is known or may include a general area proximate the user at a given time. The illustrated embodiment includes charge station identifiers, where the charge station identifiers are color-coded icons to reflect charging efficiency or charge time at that location. As shown, charge station 330 is shown in a first color indicating that the charge time to reach the desired charge level is long (e.g., more than 40 minutes), charging stations 320 are a second color indicating that the charge time is moderate (e.g., 20-40 minutes), and charging stations 310 are a third color indicating that the charge time is fast (e.g., less than 20 minutes). The colors of the charging station indicators can be any suitable color, and particularly color(s) that impart meaning, such as green for the fast-charging stations, red for the slow charging stations, etc. Further, there can be more than three different categories of charging speed/efficiency. The colors can be a gradient, for instance, where a deeper color may indicate a faster charge.

To enable embodiments described herein, the maximum power per charge point of charge stations needs to be known, or a subset of the charge station, and whether dynamic load balancing is in use. These attributes may be incorporated into the Open Charge Point Interface. Optionally, these attributes can be a customized attribute in map data. A map services provider (e.g., service provider 108) can obtain charging station information from data suppliers that aggregate EV charging station data from operators or from charging station producers, for example. As these attributes may not be known for every charging station, an indicator of whether dynamic load balancing is used at a charging station May include three states: yes, no, and unknown. If dynamic load balancing is used, the identifier data for a charging station should include a flag. This can be a binary indicator, with a one indicating the use of dynamic load balancing, a zero indicating the absence of dynamic load balancing, and a blank indicating an unknown condition.

Some charging stations may include dynamic load balancing of power among subsets of charge points. For example, a charging station may have fifteen charge points and has those fifteen charge points divided into three equal subsets of five charge points each. Thus, the load balancing may be balanced only among the subsets of five charge points.

The identification of the presence or absence of dynamic load balancing may not be available for charging stations, such that embodiments described herein can optionally estimate the presence or absence of dynamic load balancing. Historical occupancy can be analyzed to determine if vehicle charge times vary based on occupancy of the charge points at a charging station. If charging times are generally longer during peak hours of occupancy where there is relatively high occupancy than they are during slack hours of occupancy where there is relatively low occupancy, it may be reasonable to conclude that the charging station employs dynamic load balancing.

To identify the presence or absence of dynamic load balancing, certain vehicle characteristics or parameters may be considered. For example, charging times for one make or model of a vehicle may be faster than another with all other factors being equal. However, the known maximum power for a charge point may be treated as maximum power at a charge point during a slack period and it is not typically the total power for the whole charging station. The effect of occupancy on the available power cannot be calculated without knowing the total power. Hence, by identifying the maximum power provided by a charging point during slack hours when occupancy is below a predefined level, the maximum power can be determined with reasonable certainty.

If the maximum power of a charge point cannot be reliably determined, charging speeds relative to occupancy can be provided. Charging speed at a charging station with dynamic load balancing is inversely proportional to occupancy. A location employing dynamic load balancing with high occupancy is going to have a longer estimated charging time than when occupancy is low.

Embodiments described herein more accurately estimate charging time at EV charging stations and provides an additional factor for a user to consider when selecting a charge point of a charging station.

FIG. 4 illustrates a flowchart depicting methods according to an example embodiment of the present disclosure. It will be understood that each block of the flowcharts and combination of blocks in the flowcharts may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory device 204 of an apparatus employing an embodiment of the present invention and executed by a processor 202 of the apparatus. As will be appreciated, any such computer program instructions may be loaded onto a computer or other programmable apparatus (for example, hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowcharts support combinations of means for performing the specified functions and combinations of operations for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

FIG. 4 illustrates a method of analyzing metrics relating to EV charging points and facilitating selection of an EV charge point based on metrics associated with the EV charge points. As shown at 410, locations of one or more electric vehicle charging stations are determined. This may be performed based on an area around a vehicle, proximate a location where charging is anticipated to be needed, and/or along a route to a destination. A total power available at the one or more electric vehicle charging stations is determined at 420. This may be, for example, through the Open Charge Point Interface (OCPI) standard. At 430, it is determined for the one or more electric vehicle charging stations if dynamic load balancing is used. An occupancy level of charge points at each of the one or more electric vehicle charging stations is determined at 440. Based on the total available power and the occupancy of the charge points for the one or more electric vehicle charging stations, an available power at a charge point of the one or more electric vehicle charging stations is determined at 450. An estimated charge time to charge a vehicle at the one or more electric vehicle charging stations is calculated at 460 based on the available power. An indication of the estimated time to charge for the vehicle at the locations associated with the one or more electric vehicle charging stations are provided for presentation on a map displayed on a user interface at 470.

In an example embodiment, an apparatus for performing the method of FIG. 4 above may comprise a processor (e.g., the processor 202) configured to perform some or each of the operations (410-470) described above. The processor may, for example, be configured to perform the operations (410-470) by performing hardware implemented logical functions, executing stored instructions, or executing algorithms for performing each of the operations. Alternatively, the apparatus may comprise means for performing each of the operations described above. In this regard, according to an example embodiment, examples of means for performing operations 410-470 may comprise, for example, the processor 202 and/or a device or circuit for executing instructions or executing an algorithm for processing information as described above.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. An apparatus comprising at least one processor and at least one memory including computer program code, the at least one memory and computer program code configured to, with the processor, cause the apparatus to at least:

determine locations of one or more electric vehicle charging stations;

determine a total power available at the one or more electric vehicle charging stations;

determine, for the one or more electric vehicle charging stations, if dynamic load balancing is used;

determine occupancy of charge points at each of the one or more electric vehicle charging stations;

calculate an available power at a charge point of the one or more electric vehicle charging stations based on the total power available and the occupancy of the charge points for the one or more electric vehicle charging stations, wherein the available power at the charge point is determined, at least in part, based on the charging curve for a first vehicle charging at the charge point;

calculate an estimated time to charge a second vehicle at the one or more electric vehicle charging stations based on the available power, wherein the apparatus determines a target charge level for the second vehicle and calculates the estimated time to charge the second vehicle at the one or more electric vehicle charging stations based on the target charge level, the available power, and a charging curve for the second vehicle; and provide for presentation of an indication of the estimated time to charge the vehicle at the locations associated with the one or more electric vehicle charging stations on a map displayed on a user interface.

2. The apparatus of claim 1, wherein the indication of the estimated time to charge a vehicle at the locations associated with the one or more electric vehicle charging stations on the map displayed on a user interface comprises color-coded icons on the map at the locations of the one or more electric vehicle charging stations.

3. The apparatus of claim 1, wherein causing the apparatus to determine, for the one or more electric vehicle charging stations, if dynamic load balancing is used comprises causing the apparatus to:

determine historical occupancy data for the one or more electric vehicle charging stations;

analyze historical charge times during periods of relatively high occupancy and of relatively low occupancy;

determine that dynamic load balancing is used in response to charge times being significantly lower during periods of relatively high occupancy than during periods of relatively low occupancy; and determine that load balancing is not used in response to charge times being relatively consistent during periods of relatively high occupancy and during periods of relatively low occupancy.

4. The apparatus of claim 1, wherein causing the apparatus to determine occupancy of the charge points at each of the one or more electric vehicle charging stations comprises causing the apparatus to:

determine occupancy of the charge points at each of the one or more electric vehicle charging stations for an estimated time of arrival at the one or more electric vehicle charging stations and for a charging duration time period after arrival.

5. The apparatus of claim 4, wherein causing the apparatus to calculate the available power at the charge point of the one or more electric vehicle charging stations based on the total power available and the occupancy of charge points for the one or more electric vehicle charging stations comprises causing the apparatus to:

calculate the available power at the charge point of the one or more electric vehicle charging stations based on the total power available and the occupancy of charge points for the one or more electric vehicle charging stations for the charging duration time period after arrival.

6. The apparatus of claim 5, wherein the occupancy of the charge points at each of the one or more electric vehicle charging stations and for a charging duration time period after arrival are determined based on historical occupancy.

7. The apparatus of claim 1, wherein causing the apparatus to determine, for the one or more electric vehicle charging stations, if dynamic load balancing is used comprises causing the apparatus to process information associated with the one or more electric vehicle charging stations obtained from at least one of an Open Charge Point Interface, a charging station operator, a charging station owner, or a charging station service provider.

8. A computer program product comprising at least one non-transitory computer-readable storage medium having computer-executable program code portions stored therein, the computer-executable program code portions comprising program code instructions configured to:

determine locations of one or more electric vehicle charging stations;

determine a total power available at the one or more electric vehicle charging stations;

determine, for the one or more electric vehicle charging stations, if dynamic load balancing is used;

determine occupancy of charge points at each of the one or more electric vehicle charging stations;

calculate an available power at a charge point of the one or more electric vehicle charging stations based on the total power available and the occupancy of charge points for the one or more electric vehicle charging stations, wherein the available power at the charge point is determined, at least in part, based on the charging curve for a first vehicle charging at the charge point;

calculate an estimated time to charge a second vehicle at the one or more electric vehicle charging stations based on the available power, wherein the apparatus determines a target charge level for the second vehicle and calculates the estimated time to charge the second vehicle at the one or more electric vehicle charging stations based on the target charge level, the available power, and the charging curve for the second vehicle; and provide for presentation of an indication of the estimated time to charge the vehicle at the locations associated with the one or more electric vehicle charging stations on a map displayed on a user interface.

9. The computer program product of claim 8, wherein the indication of the estimated time to charge a vehicle at the locations associated with the one or more electric vehicle charging stations on the map displayed on a user interface comprises color-coded icons on the map at the locations of the one or more electric vehicle charging stations.

10. The computer program product of claim 8, wherein the program code instructions to determine, for the one or more electric vehicle charging stations, if dynamic load balancing is used comprise program code instructions to:

determine historical occupancy data for the one or more electric vehicle charging stations;

analyze historical charge times during periods of relatively high occupancy and of relatively low occupancy;

determine that dynamic load balancing is used in response to charge times being significantly lower during periods of relatively high occupancy than during periods of relatively low occupancy; and determine that load balancing is not used in response to charge times being relatively consistent during periods of relatively high occupancy and during periods of relatively low occupancy.

11. The computer program product of claim 8, wherein the program code instructions to determine occupancy of the charge points at each of the one or more electric vehicle charging stations comprise program code instructions to:

determine occupancy of the charge points at each of the one or more electric vehicle charging stations for an estimated time of arrival at the one or more electric vehicle charging stations and for a charging duration time period after arrival.

12. The computer program product of claim 11, wherein the program code instructions to calculate the available power at the charge point of the one or more electric vehicle charging stations based on the total power available and the occupancy of charge points for the one or more electric vehicle charging stations comprise program code instructions to:

calculate the available power at the charge point of the one or more electric vehicle charging stations based on the total power available and the occupancy of charge points for the one or more electric vehicle charging stations for the charging duration time period after arrival.

13. The computer program product of claim 12, wherein the occupancy of the charge points at each of the one or more electric vehicle charging stations and for a charging duration time period after arrival are determined based on historical occupancy.

14. A method comprising:

determining locations of one or more electric vehicle charging stations;

determining a total power available at the one or more electric vehicle charging stations;

determining, for the one or more electric vehicle charging stations, if dynamic load balancing is used;

determining occupancy of charge points at each of the one or more electric vehicle charging stations;

calculating an available power at a charge point of the one or more electric vehicle charging stations based on the total power available and the occupancy of charge points for the one or more electric vehicle charging stations, wherein the available power at the charge point is determined, at least in part, based on the charging curve for a first vehicle charging at the charge point;

calculate an estimated time to charge a second vehicle at the one or more electric vehicle charging stations based on the available power, wherein the apparatus determines a target charge level for the second vehicle and calculates the estimated time to charge the second vehicle at the one or more electric vehicle charging stations based on the target charge level, the available power, and a charging curve for second vehicle; and providing for presentation of an indication of the estimated time to charge the vehicle at the locations associated with the one or more electric vehicle charging stations on a map displayed on a user interface.

15. The method of claim 14, wherein the indication of the estimated time to charge a vehicle at the locations associated with the one or more electric vehicle charging stations on the map displayed on a user interface comprises color-coded icons on the map at the locations of the one or more electric vehicle charging stations.

16. The method of claim 14, wherein determining, for the one or more electric vehicle charging stations, if dynamic load balancing is used comprises:

determining historical occupancy data for the one or more electric vehicle charging stations;

analyzing historical charge times during periods of relatively high occupancy and of relatively low occupancy;

determining that dynamic load balancing is used in response to charge times being significantly lower during periods of relatively high occupancy than during periods of relatively low occupancy; and determining that load balancing is not used in response to charge times being relatively consistent during periods of relatively high occupancy and during periods of relatively low occupancy.

17. The method of claim 14, wherein determining occupancy of the charge points at each of the one or more electric vehicle charging stations comprises:

determining occupancy of the charge points at each of the one or more electric vehicle charging stations for an estimated time of arrival at the one or more electric vehicle charging stations and for a charging duration time period after arrival.

* * * * *